US008009444B2

(12) United States Patent
Duan et al.

(10) Patent No.: US 8,009,444 B2
(45) Date of Patent: Aug. 30, 2011

(54) BOOST DEVICE FOR VOLTAGE BOOSTING

(75) Inventors: Rou-Yong Duan, Guosing Township, Nantou County (TW); Rong-Da Luo, Cingshuei Township, Taichung County (TW)

(73) Assignee: Hungkuang University, Shalu, Taichung County (TW)

( * ) Notice: Subject to any disclaimer, the term of this patent is extended or adjusted under 35 U.S.C. 154(b) by 222 days.

(21) Appl. No.: 12/433,039

(22) Filed: Apr. 30, 2009

(65) Prior Publication Data

US 2010/0277955 A1    Nov. 4, 2010

(51) Int. Cl.
H02M 3/335    (2006.01)
H02M 3/18     (2006.01)
(52) U.S. Cl. ............... 363/21.04; 363/59; 363/56.01
(58) Field of Classification Search ......... 363/20–21.07, 363/21.12, 21.15, 56.09, 56.1, 56.11, 59
See application file for complete search history.

(56) References Cited

U.S. PATENT DOCUMENTS

| 5,331,533 | A  | * | 7/1994  | Smith ............................. 363/20 |
| 5,856,916 | A  | * | 1/1999  | Bonnet ........................... 363/20 |
| 7,161,331 | B2 | * | 1/2007  | Wai et al. ...................... 323/222 |
| 7,551,459 | B1 | * | 6/2009  | Wittenbreder, Jr. ........ 363/21.06 |
| 7,751,213 | B2 | * | 7/2010  | Toccaceli ..................... 363/127 |
| 7,864,549 | B1 | * | 1/2011  | Wittenbreder, Jr. ........ 363/21.06 |
| 2007/0236966 | A1 | * | 10/2007 | Uruno et al. .................... 363/20 |

* cited by examiner

Primary Examiner — Jessica Han
(74) Attorney, Agent, or Firm — Sunstein Kann Murphy & Timbers LLP

(57) ABSTRACT

A boost device boosts an input voltage to an output voltage across an output capacitor, and includes an output diode coupled to the output capacitor, and a transformer coupled to a first switch, a clamp circuit and a boost circuit. The clamp circuit is coupled across a first winding of the transformer, and includes a clamp capacitor coupled in series to a second switch. The output capacitor is capable of being charged through the output diode with an induced voltage across a second winding of the transformer. The boost circuit is capable of being charged with the induced voltage across the second winding, and of charging the output capacitor so as to boost the output voltage across the output capacitor.

7 Claims, 15 Drawing Sheets

FIG. 3j

BOOST DEVICE FOR VOLTAGE BOOSTING

BACKGROUND OF THE INVENTION

1. Field of the Invention

The invention relates to a boost device, more particularly to a DC-to-DC boost device.

2. Description of the Related Art

FIG. 1 illustrates a conventional boost device disclosed in U.S. Pat. No. 7,161,331. The conventional boost device includes a coupling circuit 10, a switch 13, a first diode 121, a second diode 122, an output diode 123, a first capacitor 141, a second capacitor 142, and an output capacitor 143. The coupling circuit 10 includes a first winding 11 and a second winding 12 each having a polarity end and a non-polarity end. The polarity end of the first winding 11 is coupled to an external power source. The first diode 121 has an anode coupled to the non-polarity end of the first winding 11, and a cathode coupled to an anode of the second diode 122. A cathode of the second diode 122 is coupled to the non-polarity end of the second winding 12 and an anode of the output diode 123. The first capacitor 141 is coupled between the cathode of the first diode 121 and ground. The second capacitor 142 is coupled between the non-polarity end of the first winding 11 and the polarity end of the second winding 12. The output capacitor 143 is coupled between a cathode of the output diode 123 and ground. The switch 13 is coupled between the non-polarity end of the first winding 11 and ground, and is operable between an ON-state and an OFF-state. Since the operation of the conventional boost device is described in detail in the aforesaid patent, further discussion of the same is omitted herein for the sake of brevity.

However, such a conventional boost device cannot provide electrical isolation. Thus, for an outdoor power supplying appliance including the conventional boost device, lightning strike may result in damage to the conventional boost device.

SUMMARY OF THE INVENTION

Therefore, an object of the present invention is to provide a boost device that can overcome the aforesaid drawback of the prior art.

According to the present invention, there is provided a boost device for boosting an input voltage supplied by an external power source to an output voltage. The boost device comprises:

a transformer having first and second windings each having opposite first and second ends, the first end of the first winding being adapted to be coupled to the external power source;

a first switch coupled between a reference node and the second end of the first winding of the transformer, and operable between an ON-state and an OFF-state;

a clamp circuit adapted to be coupled to the external power source, coupled across the first winding of the transformer, and including a series connection of a clamp capacitor and a second switch, the second switch being operable between an ON-state and an OFF-state;

an output diode having an anode coupled to the first end of the second winding of the transformer, and a cathode;

an output capacitor having a first terminal coupled to the cathode of the output diode, and a second terminal, the output voltage being a voltage across the output capacitor, the output capacitor being capable of being charged through the output diode with an induced voltage across the second winding of the transformer; and a boost circuit coupled to the anode of the output diode and the second terminal of the output capacitor, and across the second winding of the transformer, the boost circuit being capable of being charged with the induced voltage across the second winding of the transformer, and of charging the output capacitor through the output diode so as to boost the voltage across the output capacitor.

BRIEF DESCRIPTION OF THE DRAWINGS

Other features and advantages of the present invention will become apparent in the following detailed description of the preferred embodiment with reference to the accompanying drawings, of which:

FIG. 3j illustrates waveforms of a current ($i_{DZ}$) flowing through an output diode of the preferred embodiment, and a voltage ($v_{DZ}$) across the output diode;

DETAILED DESCRIPTION OF THE PREFERRED EMBODIMENT

Figure 1:
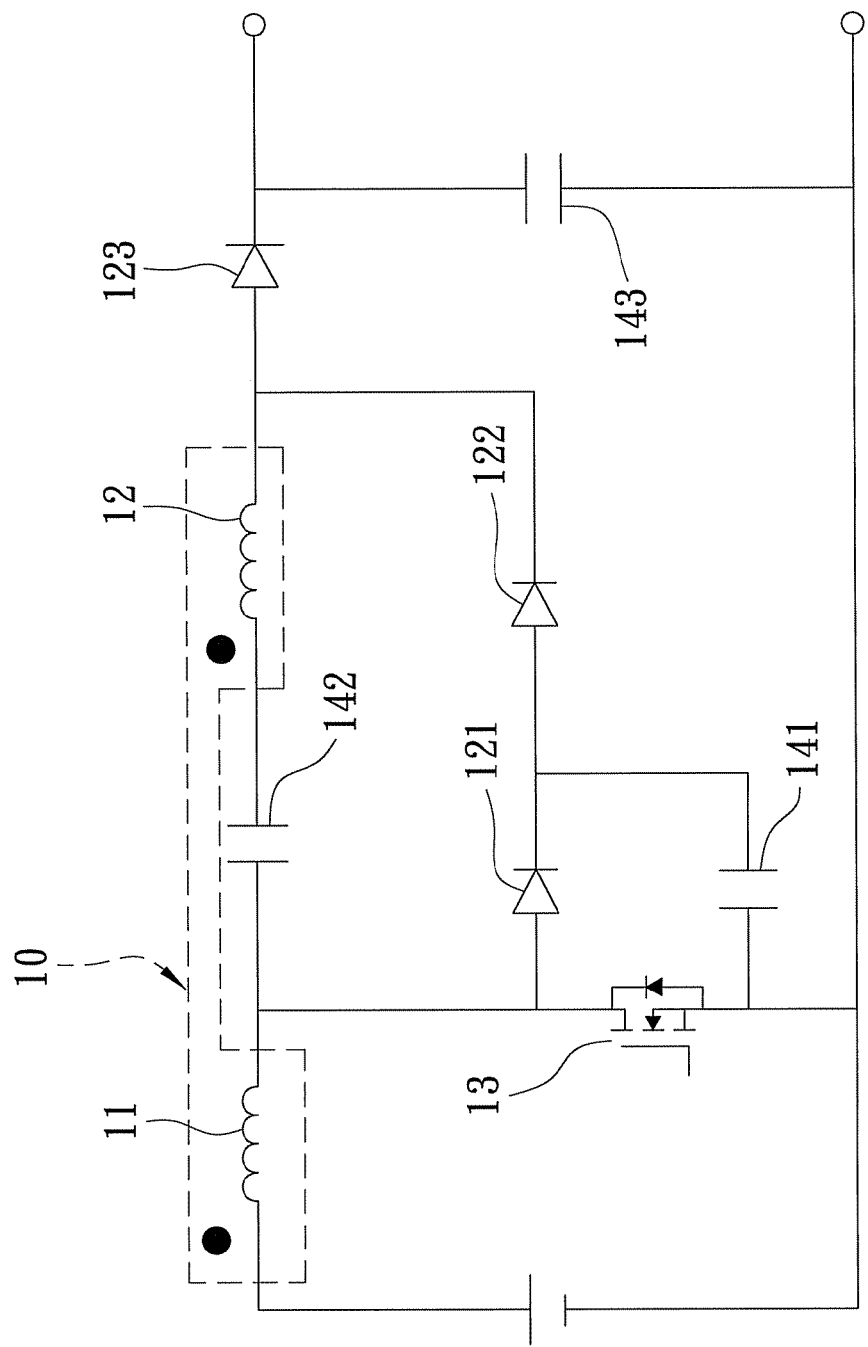
FIG. 1 is a schematic electrical circuit diagram illustrating a conventional boost device.
Figure 2:
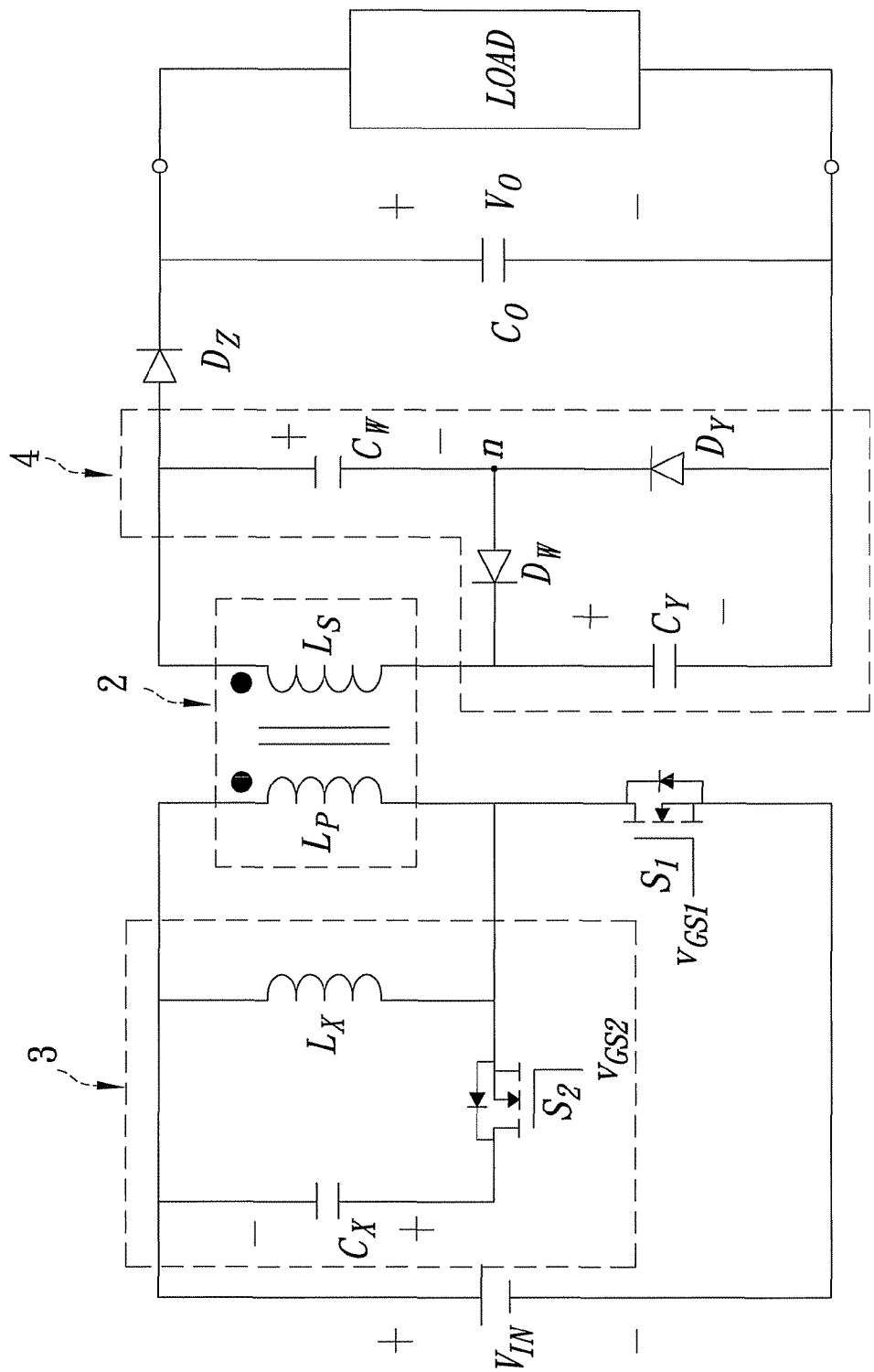
FIG. 2 is a schematic electrical circuit diagram illustrating the preferred embodiment of a boost device according to the present invention.

Referring to FIG. 2, the preferred embodiment of a boost device according to the present invention is shown to be adapted for boosting an input voltage ($V_{IN}$) supplied by an external source to an output voltage ($V_O$). The boost device includes a transformer 2, a first switch ($S_1$), a clamp circuit 3, an output diode ($D_Z$), a boost circuit 4, and an output capacitor ($C_O$).

The transformer 2 includes first and second windings ($L_P$, $L_S$) wound around an iron core (not shown). A winding ratio of the first and second windings ($L_P$, $L_S$) is equal to 1:N. Each of the first and second windings ($L_P$, $L_S$) has a polarity end serving as a first end, and a non-polarity end serving as a second end. The polarity end of the first winding ($L_P$) is adapted to be coupled to the external power source for receiving the input voltage ($V_{IN}$).

The first switch ($S_1$) is coupled between a reference node, such as ground, and the non-polarity end of the first winding ($L_P$). The first switch ($S_1$) has a control end for receiving an external control signal ($v_{GS1}$), and is operable to switch between an ON-state and an OFF-state in response to the external control signal ($v_{GS1}$).

The clamp circuit 3 is adapted to be coupled to the external power source, is coupled across the first winding ($L_P$), and includes a series connection of a clamp capacitor ($C_X$) and a second switch ($S_2$) coupled in parallel to the first winding ($L_P$), and an inductor ($L_X$) coupled in parallel to the first winding ($L_P$). The second switch ($S_2$) has a control end for receiving an external control signal ($v_{GS2}$) and is operable to switch between an ON-state and an OFF-state in response to the external control signal ($v_{GS2}$).

Figure 3A:
FIGS. 3a and 3b illustrate waveforms of external control signals ($v_{GS1}$, $v_{GS2}$) for first and second switches of the preferred embodiment, respectively.
Figure 3B:
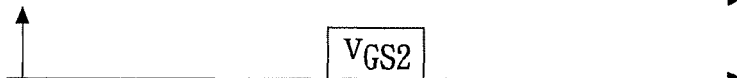

It is noted that, based on the external control signals ($v_{GS1}$, $v_{GS2}$) shown in FIGS. 3a and 3b, the first and second switches ($S_1$, $S_2$) are operated alternately in the ON-state, and duration of the ON-state of one of the first and second switches ($S_1$, $S_2$) does not overlap duration of the ON-state of the other one of the first and second switches ($S_1$, $S_2$).

The output diode ($D_Z$) has an anode coupled to the polarity end of the second winding ($L_S$), and a cathode.

The output capacitor ($C_O$) is adapted to be coupled to a load in parallel, and has a first terminal coupled to the cathode of the output diode ($D_Z$), and a grounded second terminal. The output voltage ($V_O$) is a voltage across the output capacitor ($C_O$). The output capacitor ($C_O$) is capable of being charged through the output diode ($D_Z$) with an induced voltage across the second winding ($L_S$).

The boost circuit 4 is coupled to the anode of the output diode ($D_Z$) and the second terminal of the output capacitor ($C_O$), and across the second winding ($L_S$). The boost circuit 4 is capable of being charged with the induced voltage across the second winding ($L_S$), and of charging the output capacitor ($C_O$) through the output diode ($D_Z$) so as to boost the voltage across the output capacitor ($C_O$).

Figure 4:
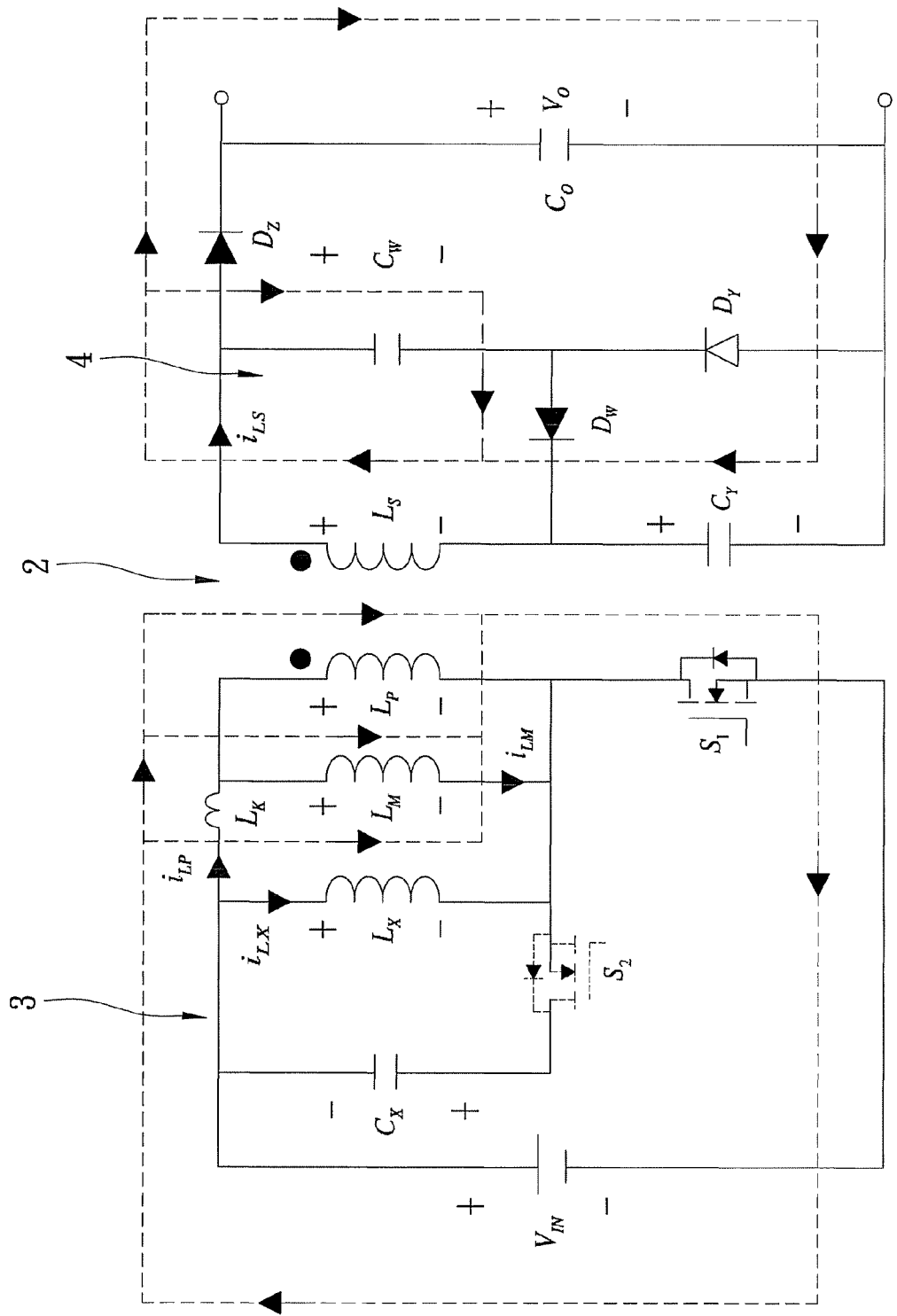
FIG. 4 is a schematic equivalent electrical circuit diagram illustrating the preferred embodiment when operated in a first mode.
Figure 5:
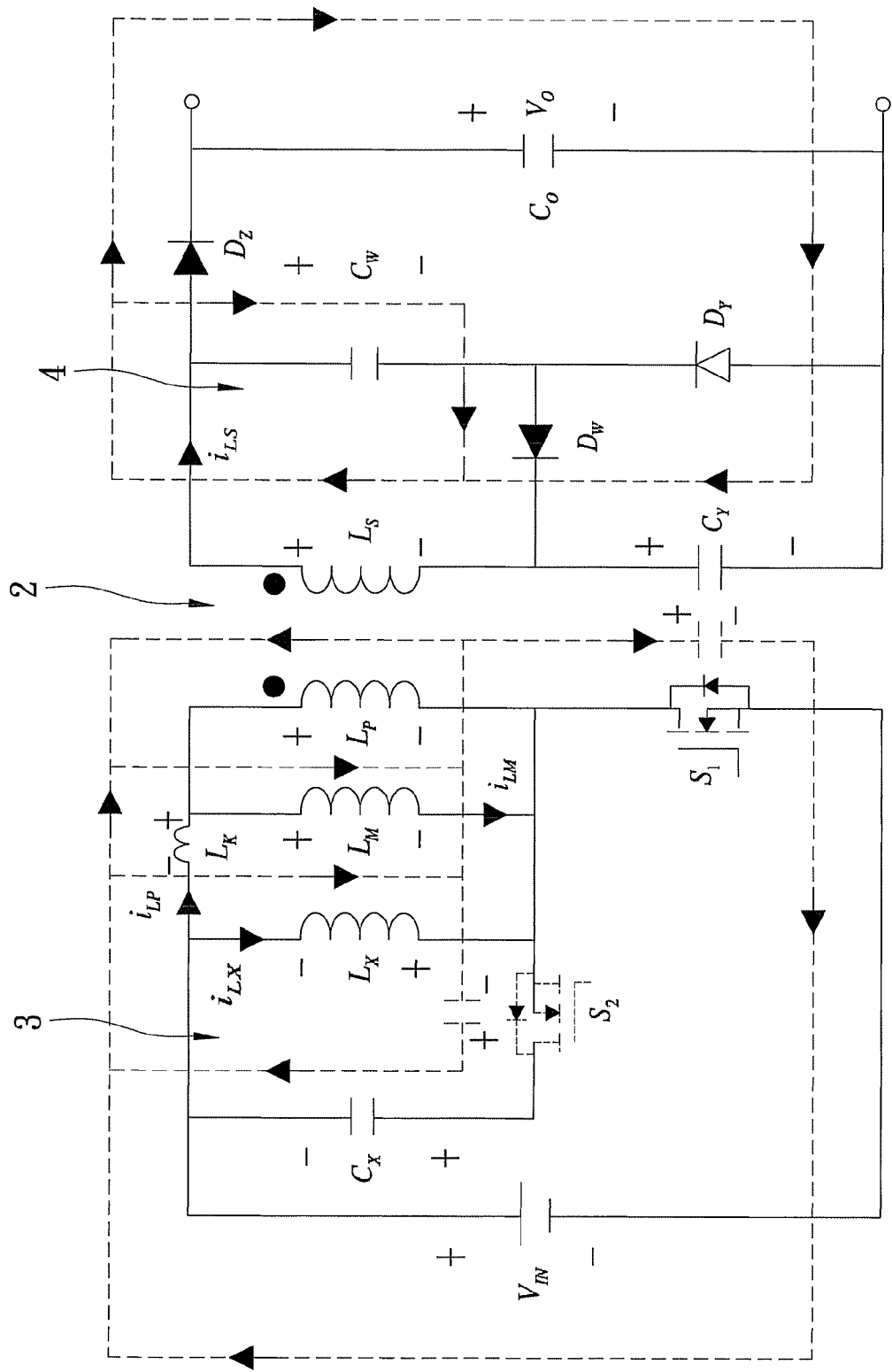
FIG. 5 is a schematic equivalent electrical circuit diagram illustrating the preferred embodiment when operated in a second mode.
Figure 6:
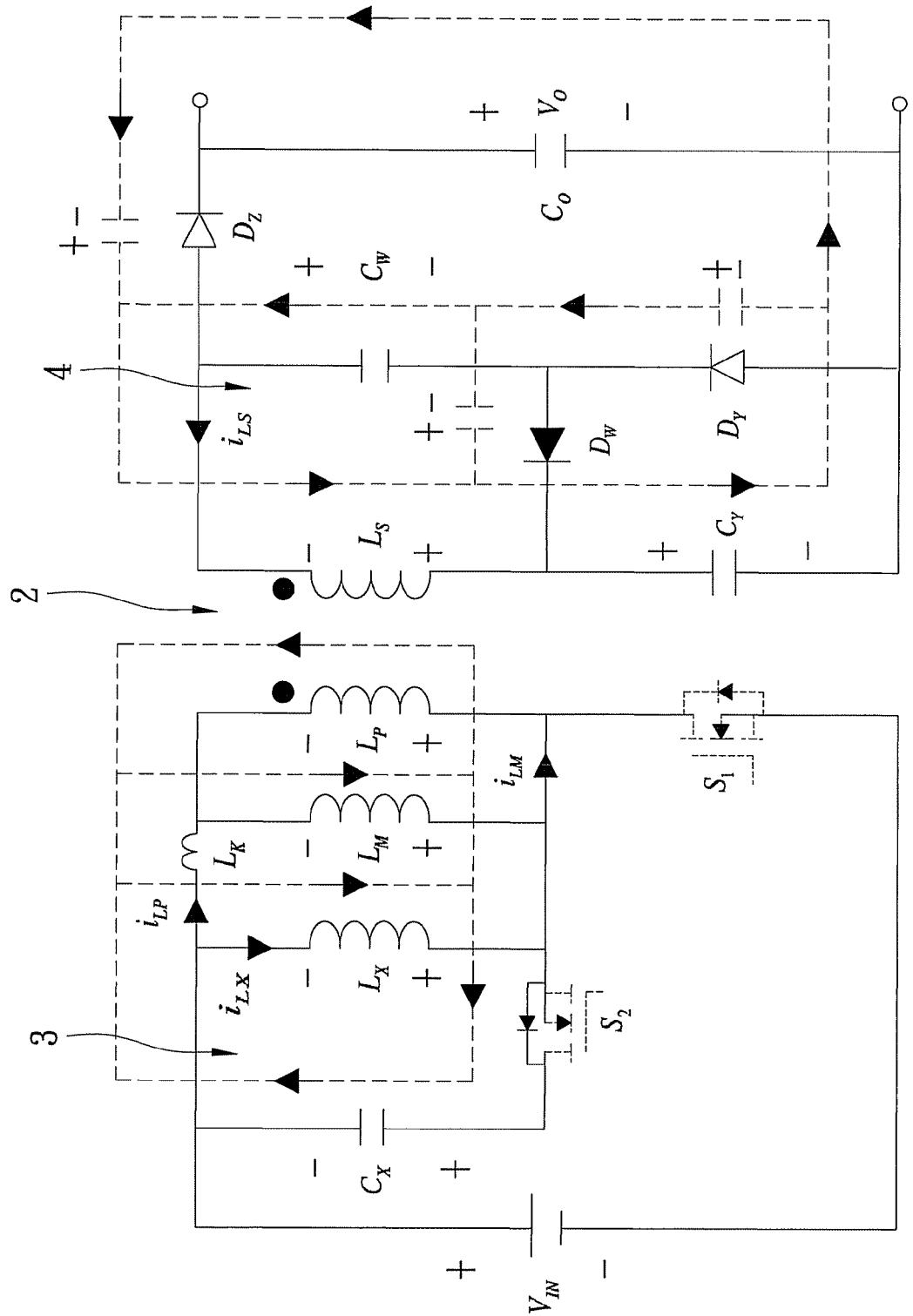
FIG. 6 is a schematic equivalent electrical circuit diagram illustrating the preferred embodiment when operated in a third mode.
Figure 7:
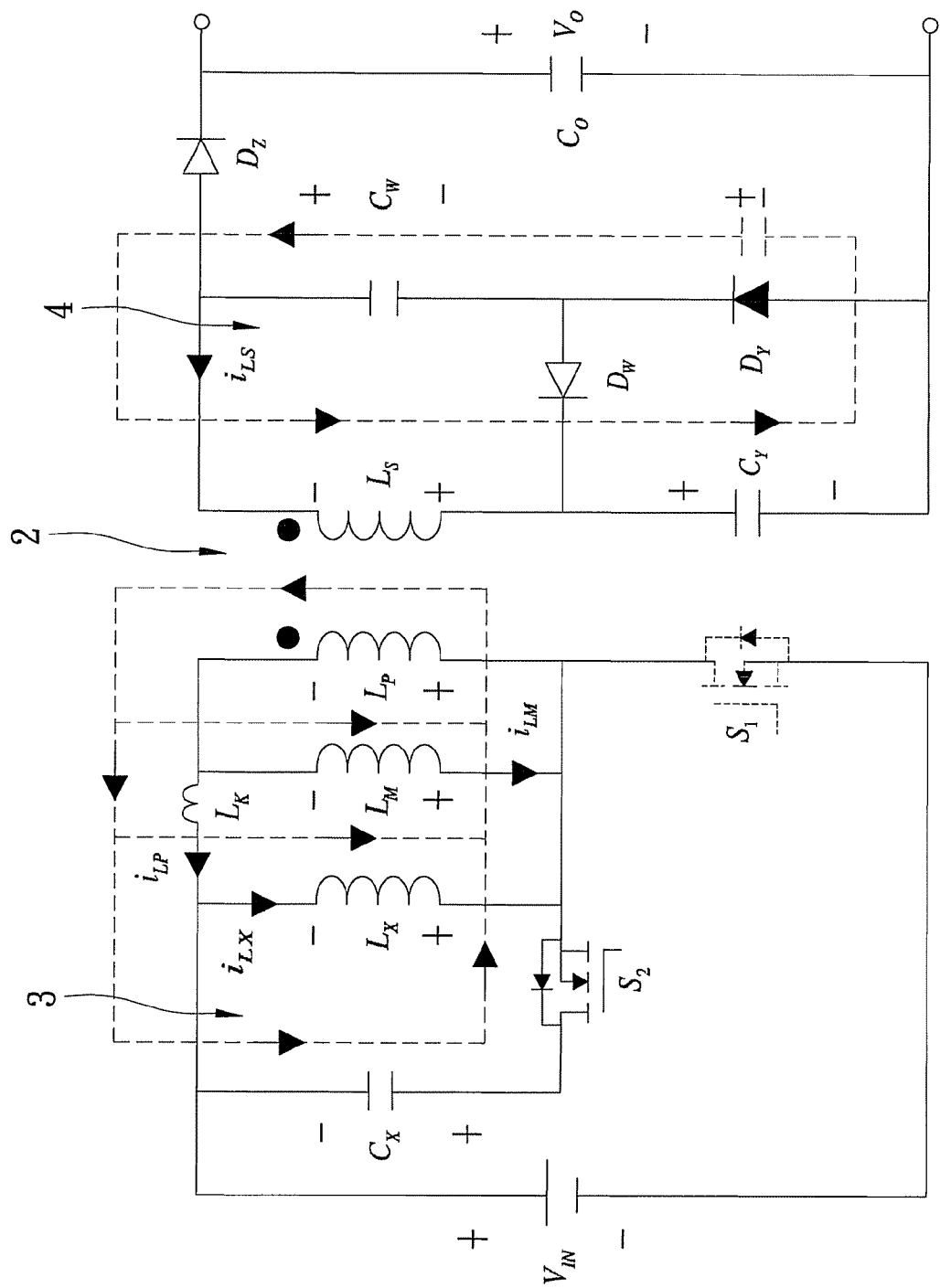
FIG. 7 is a schematic equivalent electrical circuit diagram illustrating the preferred embodiment when operated in a fourth mode.
Figure 8:
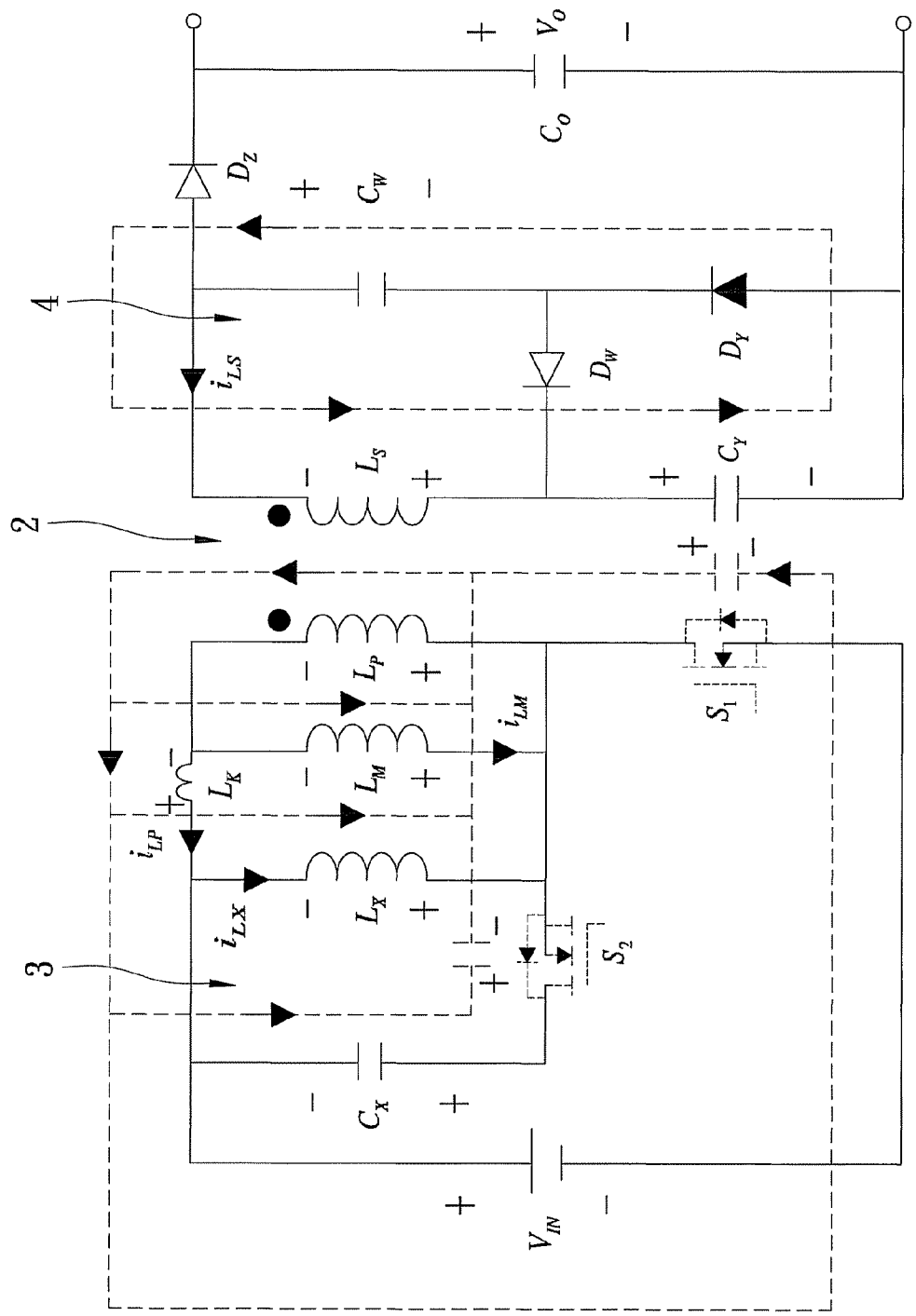
FIG. 8 is a schematic equivalent electrical circuit diagram illustrating the preferred embodiment when operated in a fifth mode.
Figure 9:
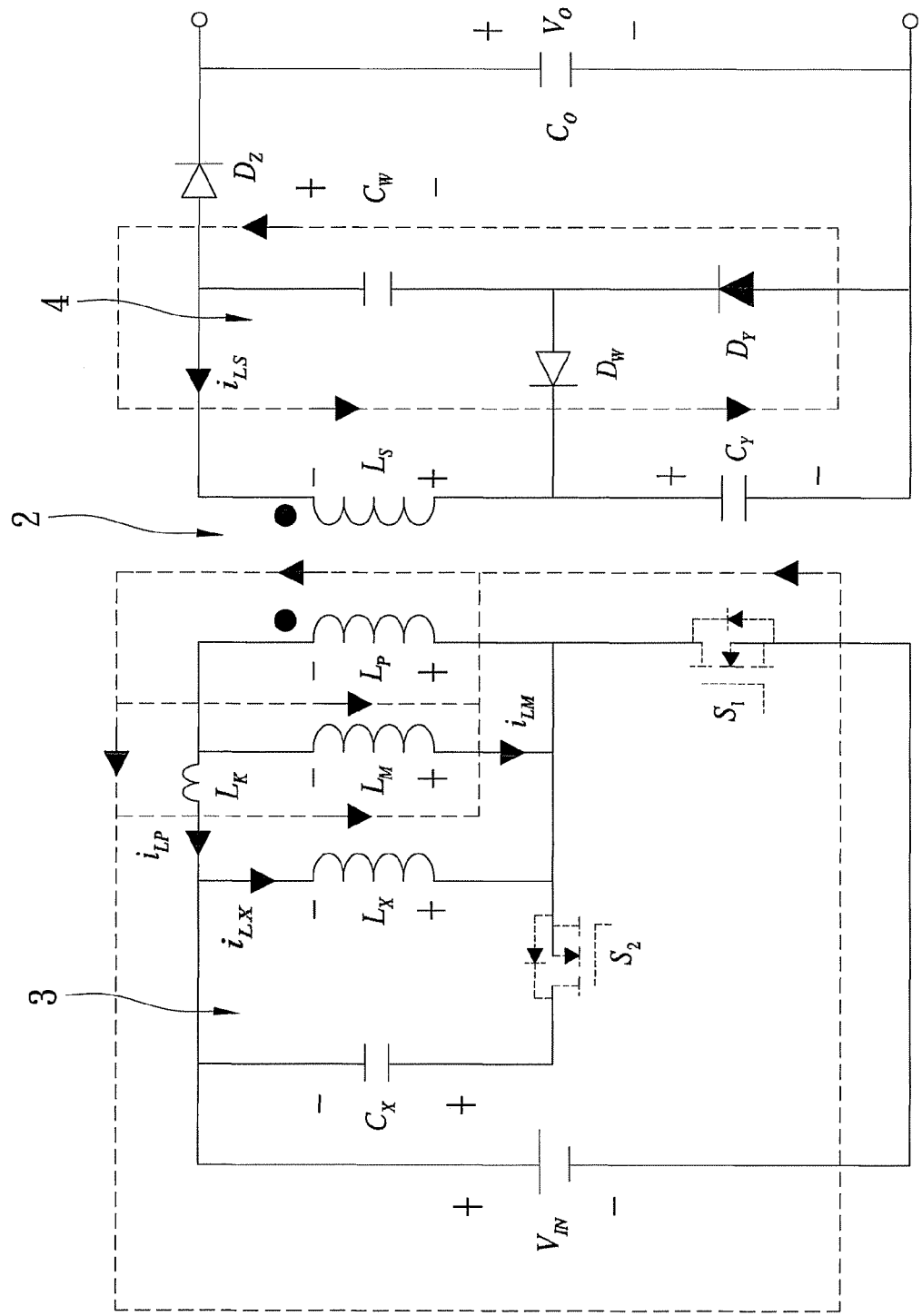
FIG. 9 is a schematic equivalent electrical circuit diagram illustrating the preferred embodiment when operated in a sixth mode.
Figure 10:
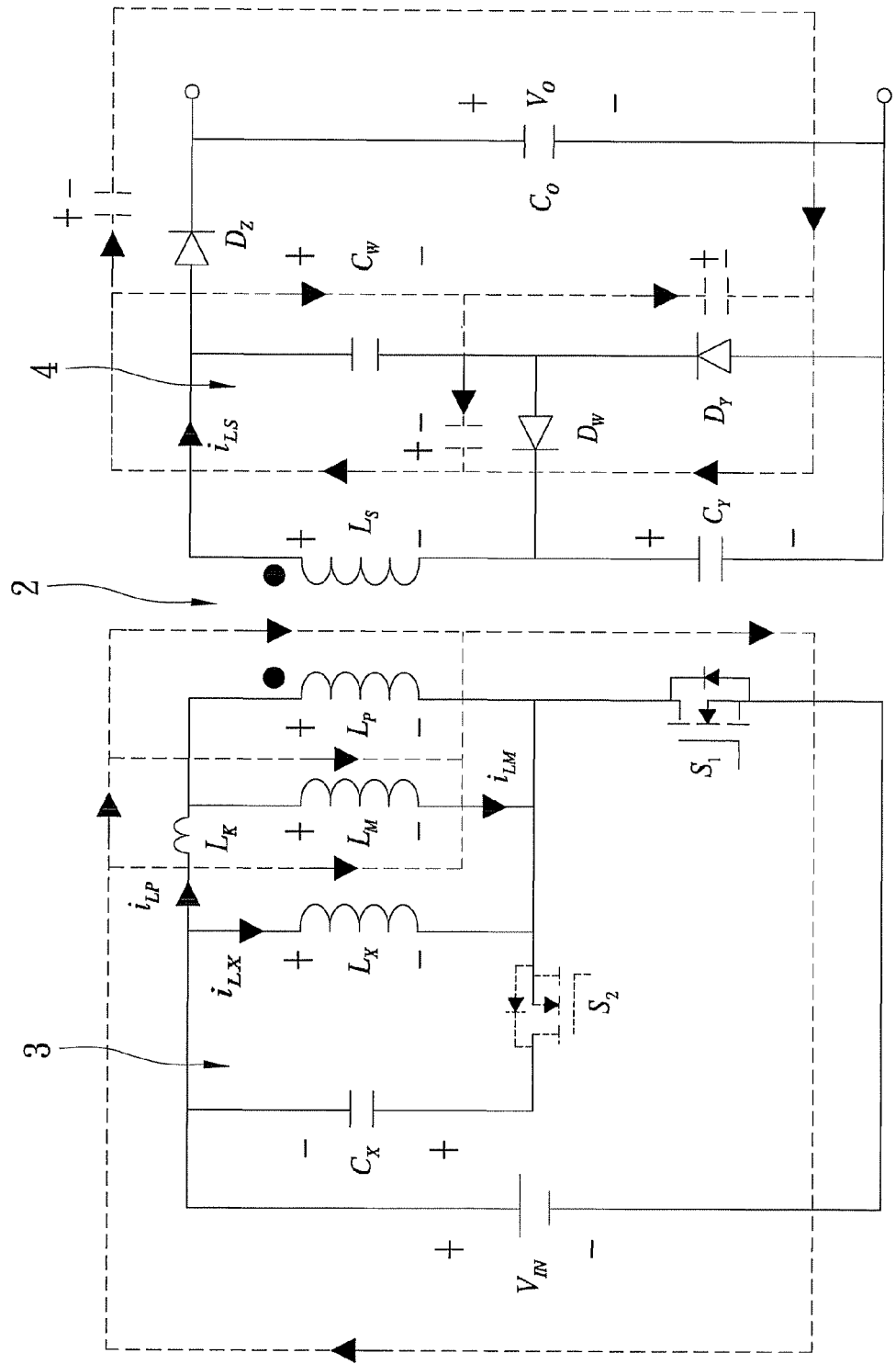
FIG. 10 is a schematic equivalent electrical circuit diagram illustrating the preferred embodiment when operated in a seventh mode.

In this embodiment, the boost circuit 4 includes a first capacitor ($C_Y$), a series connection of a first diode ($D_W$) and a second capacitor ($C_W$), and a second diode ($D_Y$). The first capacitor ($C_Y$) is coupled between the non-polarity end of the second winding ($L_S$) and the second terminal of the output capacitor ($C_O$). It is noted that the output capacitor ($C_O$) is further charged through the output diode ($D_Z$) with a voltage across the first capacitor ($C_Y$) when the output capacitor ($C_O$) is charged with the induced voltage across the second winding ($L_S$), as best shown in FIGS. 4 and 5. The series connection of the first diode ($D_W$) and the second capacitor ($C_W$) is coupled in parallel to the second winding ($L_S$). When the output capacitor ($C_O$) is charged through the output diode ($D_Z$) with the induced voltage across the second winding ($L_S$), the second capacitor ($C_W$) is charged through the first diode ($D_W$) with the induced voltage across the second winding ($L_S$), as best shown in FIGS. 4 and 5. The second diode ($D_Y$) has an anode coupled to the second terminal of the output capacitor ($C_O$), and a cathode coupled to a common node (n) between the anode of the first diode ($D_W$) and the second capacitor ($C_W$). The first capacitor ($C_Y$) is capable of being charged through the second diode ($D_Y$) with a voltage across the second capacitor ($C_W$), as best shown in FIGS. 7, 8 and 9. It is noted that the first diodes ($D_W$) and the second diode ($D_Y$) do not conduct simultaneously.

Figure 3C:
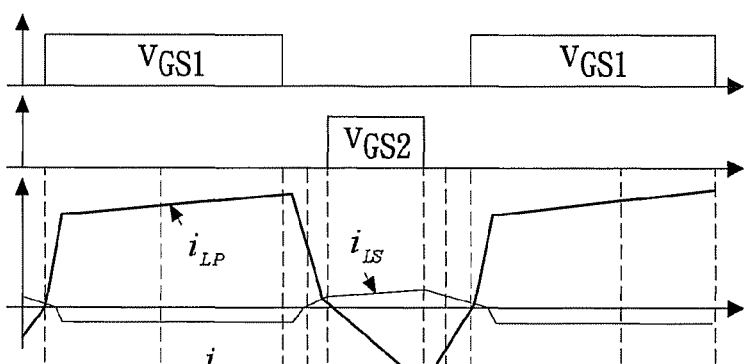
FIG. 3c illustrates waveforms of currents ($i_{LP}$, $i_{LS}$) flowing respectively through first and second windings of a transformer of the preferred embodiment.
Figure 3D:
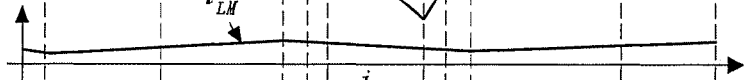
FIG. 3d illustrates a waveform of an exciting current ($i_{LM}$) of the transformer of the preferred embodiment.
Figure 3E:
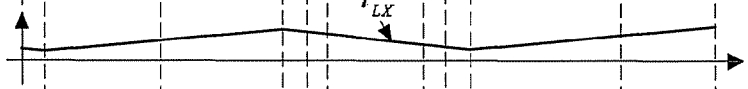
FIG. 3e illustrates a waveform of a current ($i_{LX}$) flowing through an inductor of a clamp circuit of the preferred embodiment.
Figure 3F:
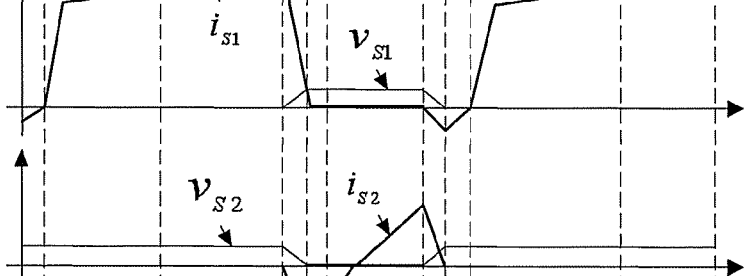
FIG. 3f illustrates waveforms of a current ($i_{S1}$) flowing through a first switch of the preferred embodiment, and a voltage ($v_{S1}$) across the first switch.
Figure 3G:
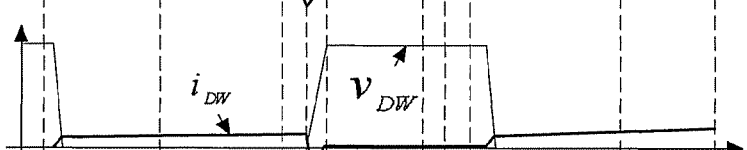
FIG. 3g illustrates waveforms of a current ($i_{S2}$) flowing through a second switch of the preferred embodiment, and a voltage ($v_{S2}$) across the second switch.
Figure 3H:
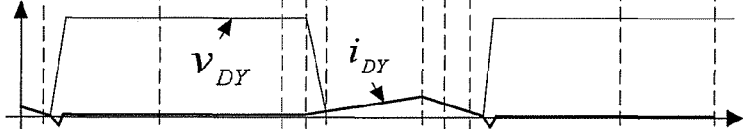
FIG. 3h illustrates waveforms of a current ($i_{DW}$) flowing through a first diode of a boost circuit of the preferred embodiment, and a voltage ($v_{DW}$) across the first diode.
Figure 3I:
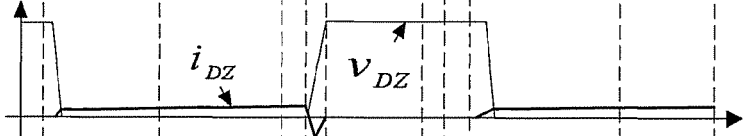
FIG. 3i illustrates waveforms of a current ($i_{DY}$) flowing through a second diode of the boost circuit of the preferred embodiment, and a voltage ($v_{DY}$) across the second diode.

The boost device of the preferred embodiment is operable among first to seventh modes based on the external control signals ($v_{GS1}$, $v_{GS2}$) for the first and second switches ($S_1$, $S_2$) shown in FIGS. 3a and 3b. FIG. 3d illustrates a waveform of an exciting current ($i_{LM}$) of the transformer 2. FIG. 3c illustrates waveforms of currents ($i_{LP}$, $i_{LS}$) flowing respectively through the first and second windings ($L_P$, $L_S$). FIG. 3e illustrates a waveform of a current ($i_{LX}$) flowing through the inductor ($L_X$) of the clamp circuit 3. FIG. 3f illustrates waveforms of a current ($i_{S1}$) flowing through the first switch ($S_1$), and a voltage ($v_{S1}$) across the first switch ($S_1$). FIG. 3g illustrates waveforms of a current ($i_{S2}$) flowing through the second switch ($S_2$), and a voltage ($v_{S2}$) across the second switch ($S_2$). FIG. 3h illustrates waveforms of a current ($i_{DW}$) flowing through the first diode ($D_W$) of the boost circuit 4, and a voltage ($v_{DW}$) across the first diode ($D_W$). FIG. 3i illustrates waveforms of a current ($i_{DY}$) flowing through the second diode ($D_Y$) of the boost circuit 4, and a voltage ($v_{DY}$) across the second diode ($D_Y$). FIG. 3j illustrates waveforms of a current ($i_{DZ}$) flowing through the output diode ($D_Z$), and a voltage ($v_{DZ}$) across the output diode ($v_{DZ}$).

Referring further to FIGS. 3a to 3i, and 4, the boost device is operated in the first mode during a period from $t_0$ to $t_1$. In FIG. 4, $L_M$ represents an exciting inductance of the transformer 2, and $L_k$ represents a leakage inductance of the first winding ($L_P$). In the first mode, the first switch ($S_1$) is in the ON-state, the second switch ($S_2$) is in the OFF-state, and the output diode ($D_Z$) and the first diode ($D_W$) conduct. The first winding ($L_P$) is excited by a current from the external power source to generate an induced voltage equal to $V_{IN}$ across the first winding ($L_P$). Thus, the induced voltage across the second winding ($L_S$) is equal to $NV_{IN}$. In this case, the output capacitor ($C_O$) is charged through the output diode ($D_Z$) with the induced voltage across the second winding ($L_S$) and the voltage across the first capacitor ($C_Y$) (equal to $NV_{IN}/(1-d)$ which will be described in detail later, where d is the duty cycle of the first switch ($S_1$)) to $NV_{IN}(2-d)/(1-d)$. That is, the output voltage ($V_O$) is equal to $NV_{IN}(2-d)/(1-d)$. Thus, a boost ratio ($G_V$) of the boost device is represented by $V_O/V_{IN}=N(2-d)/(1-d)$. At the same time, the second capacitor ($C_W$) is charged through the first diode ($D_W$) with the induced voltage across the second winding ($L_S$) to $NV_{IN}$ so as to clamp a voltage across the second diode ($D_Y$). Thus, the voltage ($v_{CW}$) across the second capacitor ($C_W$) is represented as follows:

$$v_{CW}=NV_{IN} \quad \text{(Equation 1)}$$

In the first mode, the current ($i_{LP}$) flowing through the first winding ($L_P$) includes the exciting current ($i_{LM}$) and an induced current equal to $Ni_{LS}$. When the waveform of the current ($i_{S1}$) flowing through the first switch ($S_1$) is close to be a square shape through appropriate configuration of the exciting inductance and the leakage inductance, the first switch ($S_1$) has a relatively low conduction loss.

Referring to FIGS. 3a to 3i, and 5, the boost device is operated in the second mode during a period from $t_1$ to $t_2$. In the second mode, the first and second switches ($S_1$, $S_2$) are in the OFF-state, and the output diode ($D_Z$) and the first diode ($D_W$) conduct. Energy attributed to the leakage inductance ($L_k$) of the first winding ($L_P$) is released to the transformer 2 such that the second winding ($L_S$) is operated as in the first mode. In this case, the current ($i_{LP}$) flowing through the first winding ($L_P$) decreases and begins to charge a parasitic capacitance of the first switch ($S_1$) such that the voltage ($v_{S1}$) across the first switch ($S_1$) rises (see FIG. 3f). On the other hand, a parasitic capacitance of the second switch ($S_2$) discharges such that the voltage ($v_{S2}$) across the second switch ($S_2$) reduces to zero (see FIG. 3g). Thus, a sum of the voltage ($v_{S1}$) across the first switch ($S_1$) and the voltage ($v_{S2}$) across the second switch ($S_2$) is equal to a sum of a voltage ($v_{CX}$) across the clamp capacitor ($C_X$) and the input voltage ($v_{IN}$). That is, $v_{S1}+v_{S2}=v_{CX}+V_{IN}$.

Referring to FIGS. 3a to 3i, and 6, the boost device is operated in the third mode during a period from $t_2$ to $t_3$. In the third mode, the first and second switches ($S_1$, $S_2$) are in the OFF-state. When the voltage ($v_{S2}$) across the second switch ($S_2$) is zero, a substrate diode of the second switch ($S_2$) conducts such that the current ($i_{LX}$) flowing through the inductor ($L_X$) and the current ($i_{LP}$) flowing through the first winding ($L_P$) flow to the clamp capacitor ($C_X$). Thus, the voltage ($v_{S1}$) across the first switch ($S_1$) is clamped. When the duty cycle of the first switch ($S_1$) is represented by "d", based on the voltage-second theorem, the voltage ($v_{CX}$) across the clamp capacitor ($C_K$) is determined according to the following Equation 2:

$$v_{CX}=V_{IN}d/(1-d) \quad \text{(Equation 2)}$$

and the voltage ($v_{S1}$) across the first switch ($S_1$) is determined according to the following Equation 3:

$$v_{S1}=V_{IN}+V_{CX}-v_{S2} \quad \text{(Equation 3)}$$

It is noted that, when $v_{S2}=0$, the voltage ($v_{S1}$) across the first switch ($S_1$) has a maximum value equal to $V_{IN}+v_{CX}$ ($=V_{IN}/(1-d)=V_O/[N(2-d)]$). That is, the clamp voltage of the first switch ($S_1$) is $V_{IN}+V_{CX}$. Since energy attributed to the leakage inductance ($L_K$) of the first winding ($L_P$) is released, the current ($i_{LS}$) flowing through the second winding ($L_S$) decreases to zero at $t_2$ (see FIG. 3c). The current ($i_{LS}$) flowing through the second winding ($S_2$) is reversed and gradually increases such that a parasitic capacitance of the second diode ($D_Y$) of the boost circuit 4 discharges and that parasitic capacitances of the first diode ($D_W$) and the output diode ($D_Z$) are charged. Therefore, the relationship among the voltage ($v_{DW}$) across the first diode ($D_W$), the voltage ($v_{DY}$) across the second diode ($D_Y$) and the voltage ($v_{CY}$) across the first capacitor ($C_Y$) is determined according to the following equation 4:

$$v_{DW}+v_{DY}=v_{CY} \quad \text{(Equation 4)}$$

According to the Equation 3, the voltages ($v_{DW}$, $v_{DY}$) across the first and second diodes ($D_W$, $D_Y$) clamp each other, and each of the voltages ($v_{DW}$, $v_{DY}$) across the first and second diodes ($D_W$, $D_Y$) has a maximum value equal to $v_{CY}$.

Referring to FIGS. 3a to 3i, and 7, the boost device is operated in the fourth mode during a period from $t_3$ to $t_4$. In the fourth mode, the first switch ($S_1$) is in the OFF-state, the second switch ($S_2$) is in the ON-state, and the second diode ($D_Y$) conducts. The current ($i_{LP}$) flowing through the first winding ($L_P$) decreases to zero at $t_3$, and then reversely increases as a result of receipt of the current ($i_{LX}$) flowing through the inductor ($L_X$). In this case, the clamp capacitor ($C_X$) discharges through the second switch ($S_2$). The current ($i_{CX}$) flowing through the clamp capacitor ($C_X$), the current ($i_{LX}$) flowing through the inductor ($L_X$) and the exciting current ($i_{LM}$) reversely flow to the first winding ($L_P$). Thus, the induced voltage ($v_{LS}$) across the second winding ($L_S$) is equal to N times the voltage ($v_{CX}$) across the clamp capacitor ($C_X$), and the first capacitor ($C_Y$) is charged through the second diode ($D_Y$) with the induced voltage ($v_{LS}$) across the second winding ($L_S$) and the voltage ($v_{CW}$) across the second capacitor ($C_W$). Referring to the Equations 1 and 2, the voltage ($v_{CY}$) across the first capacitor ($C_Y$) is determined according to the following Equation 5:

$$\begin{aligned} v_{CY} &= v_{LS}+v_{CW}=Nv_{CX}+NV_{IN} \quad \text{(Equation 5)} \\ &= NV_{IN}d/(1-d)+NV_{IN} \\ &= NV_{IN}/(1-d) \end{aligned}$$

As shown in FIG. 3g, the second switch ($S_2$) has zero-voltage switching characteristics during transformation from the OFF-state to the ON-state.

Referring to FIGS. 3a to 3i, and 8, the boost device is operated in the fifth mode during a period from $t_4$ to $t_5$. In the fifth mode, the first and second switches ($S_1$, $S_2$) are in the OFF-state, and the second diode ($D_Y$) conducts. The parasitic capacitance of the second switch ($S_2$) is charged and the parasitic capacitance of the first switch ($S_1$) discharges. In this case, the voltages ($v_{S1}$, $v_{S2}$) across the first and second switches ($S_1$, $S_2$) are similar to those in the second mode. The second winding ($L_S$) is operated as in the fourth mode, but the current ($i_{LS}$) flowing through the second winding ($L_S$) gradually decreases.

Referring to FIGS. 3a to 3i, and 9, the boost device is operated in the sixth mode during a period from $t_5$ to $t_6$. In the sixth mode, the first and second switches ($S_1$, $S_2$) are in the OFF-state. When the parasitic capacitance of the first switch ($S_1$) discharges to zero, the substrate diode of the first switch ($S_1$) conducts such that the voltage ($v_{S2}$) across the second switch ($S_2$) is clamped to $V_{IN}+v_{CX}$. Therefore, the first and second switches ($S_1$, $S_2$) have the same clamp voltage.

Referring to FIGS. 3a to 3i, and 10, the boost device is operated in the seventh mode during a period from $t_6$ to $t_7$. In the seventh mode, the first switch ($S_1$) is in the ON-state and the second switch ($S_2$) is in the OFF-state. While the substrate diode of the first switch ($S_1$) conducts, the first switch ($S_1$) is triggered to switch from the OFF-state to the ON-state. Therefore, as shown in FIG. 3f, the first switch ($S_1$) has zero-voltage switching characteristics. When the current ($i_{LP}$) flowing through the first winding ($L_P$) has an amplitude equal to that of the exciting current ($i_{LM}$) of the transformer 2, the first winding ($L_P$) receives energy again such that the current ($i_{LS}$) flowing through the second winding ($L_S$) gradually increases. In this case, the parasitic capacitances of the first diode ($D_W$) and the output diode ($D_Z$) discharge, and the parasitic capacitance of the second diode ($D_Y$) is charged.

When the parasitic capacitance of the output diode ($D_Z$) discharges to zero, the output diode ($D_Z$) conducts such that the output capacitor ($C_O$) is charged through the output diode ($D_Z$) with the induced voltage ($v_{LS}$) across the second winding ($L_S$) (equal to $NV_{IN}$) and the voltage ($v_{CY}$) across the first capacitor ($C_Y$) (equal to $NV_{IN}/(1-d)$) to $v_{LS}+v_{CY}$. As a result, the output voltage ($V_O$) is equal to $NV_{IN}(2-d)/(1-d)$. When the parasitic capacitance of the first diode ($D_W$) discharges to zero, the first diode ($D_W$) conducts such that the boost device is switched from the seventh mode to the first mode.

FIGS. 11 to 18 illustrate experimental measurement results when the boost device of the preferred embodiment is operated under the input voltage ($V_{IN}$) of 17V, the output voltage ($V_H$) of 400V and an output power of 400 W.

Figure 11:
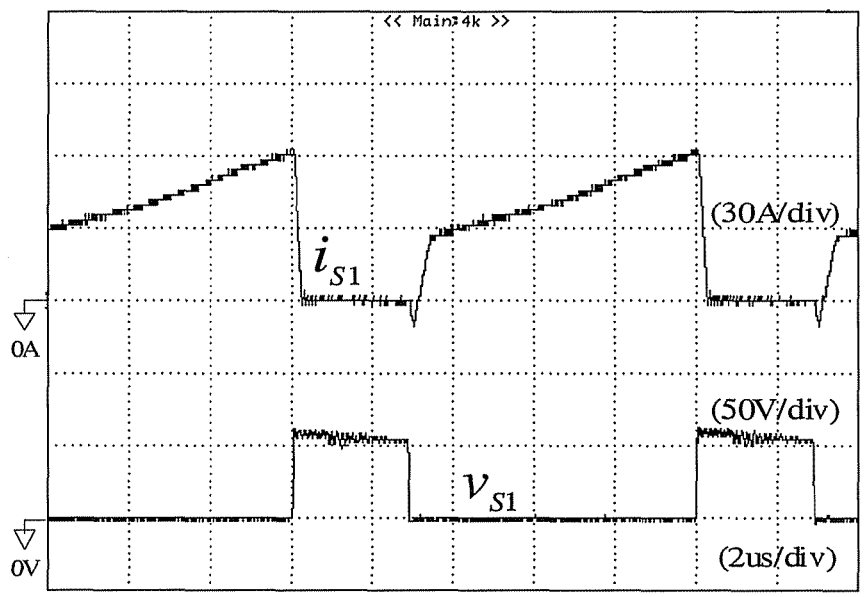
FIG. 11 is a plot illustrating experimental measurement results of the current ($i_{S1}$) flowing though the first switch and the voltage ($v_{S1}$) across the first switch.
Figure 12:
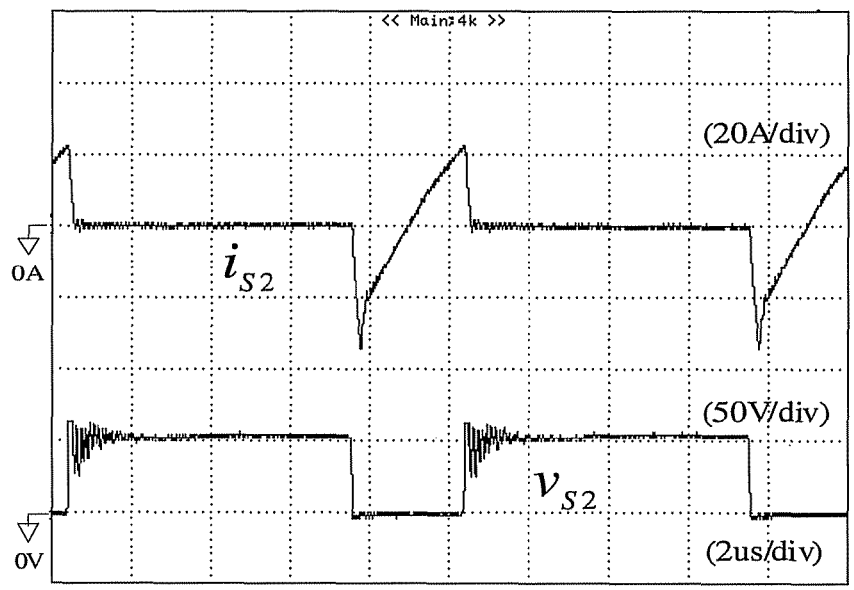
FIG. 12 is a plot illustrating experimental measurement results of the current ($i_{S2}$) flowing though the second switch and the voltage ($v_{S2}$) across the second switch.

As shown in FIGS. 11 and 12, the voltages ($v_{S1}$, $v_{S2}$) across the first and second switches ($S_1$, $S_2$) are clamped to about 55V. The first and second switches ($S_1$, $S_2$) have zero-voltage switching characteristics during trans formation from the OFF-state to the ON-state. Furthermore, the second switch ($S_2$) has synchronous rectifying characteristics.

Figure 13:
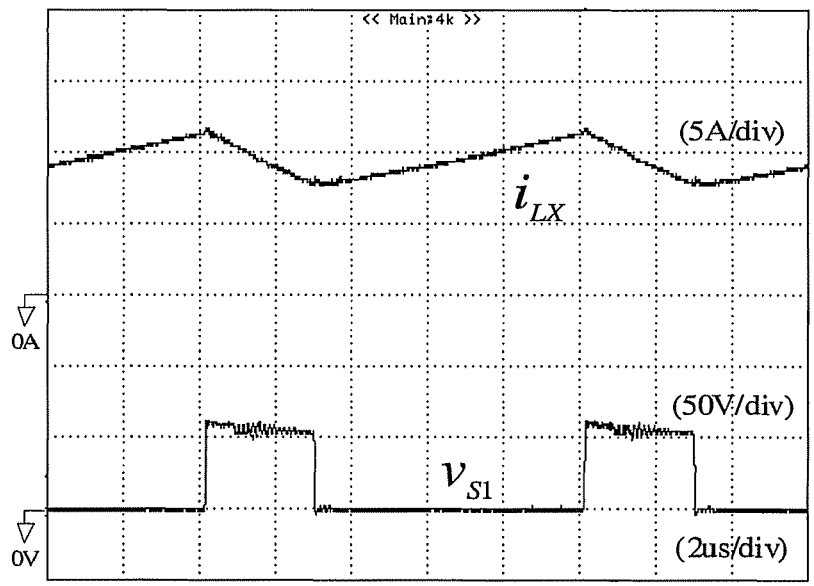
FIG. 13 is a plot illustrating experimental measurement results of the current ($i_{LX}$) flowing through the inductor, and the voltage ($v_{S1}$) across the first switch.

As shown in FIG. 13, the current ($i_{LX}$) flowing through the inductor ($L_X$) is capable of effective sharing with the exciting current ($i_{LM}$) of the transformer 2.

Figure 14:
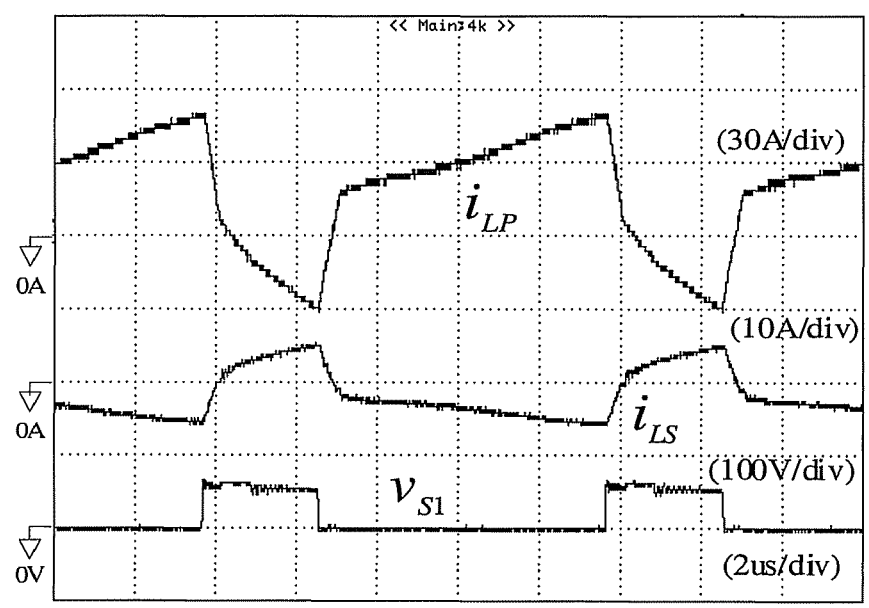
FIG. 14 is a plot illustrating experimental measurement results of the currents ($i_{LP}$, $i_{LS}$) flowing respectively through the first and second windings, and the voltage ($v_{S1}$) across the first switch.

As shown in FIG. 14, the first winding ($L_P$) has low-voltage large-current characteristics, whereas the second winding ($L_S$) has high-voltage small-current characteristics.

Figure 15:
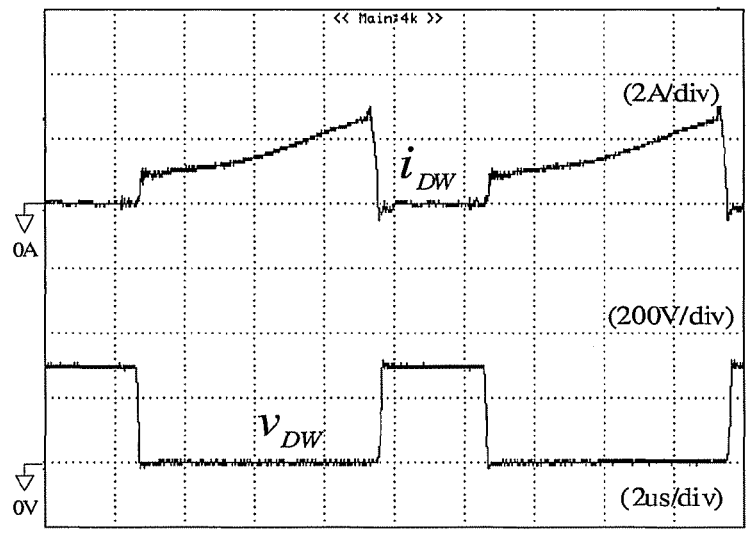
FIG. 15 is a plot illustrating experimental measurement results of the current ($i_{DW}$) flowing though the first diode and the voltage ($v_{DW}$) across the first diode.
Figure 16:
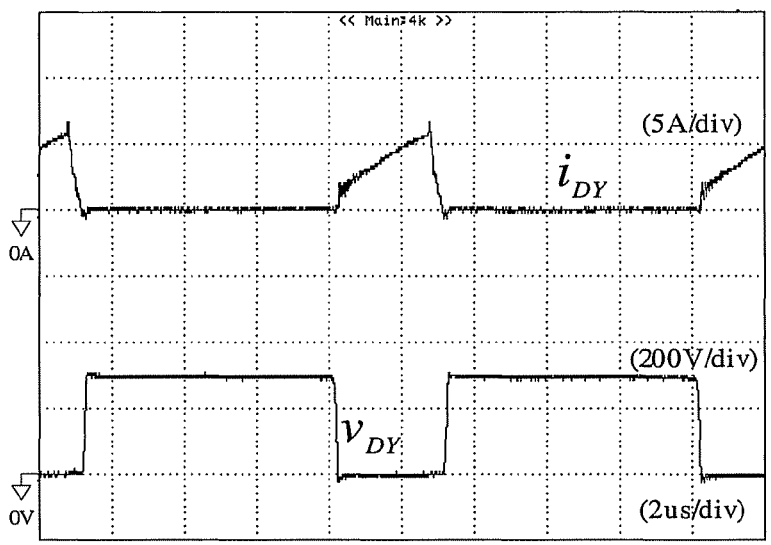
FIG. 16 is a plot illustrating experimental measurement results of the current ($i_{DY}$) flowing though the second diode and the voltage ($v_{DY}$) across the second diode.

As shown in FIGS. 15 and 16, the first and second diodes ($D_W$, $D_Y$) are clamped to 300V that is less than the output voltage ($V_O$) of 400V. The currents ($i_{DW}$, $i_{DY}$) must flow through a leakage inductance of the second winding ($L_S$), thereby suppressing a reverse recovery current.

Figure 17:
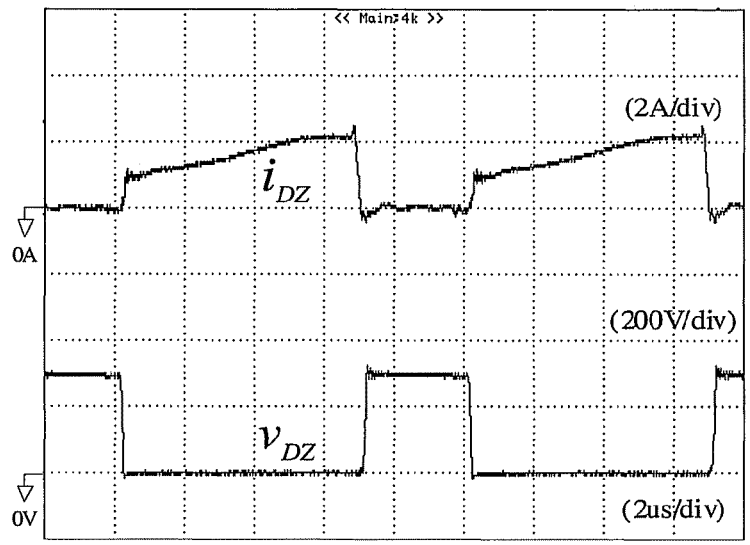
FIG. 17 is a plot illustrating experimental measurement results of the current ($i_{DZ}$) flowing though the output diode and the voltage ($v_{DZ}$) across the output diode.

As shown in FIG. 17, the output diode ($D_Z$) has a relatively long conduction duration without an inrush current. Therefore, ripples of the output voltage ($V_O$) are reduced.

Figure 18:
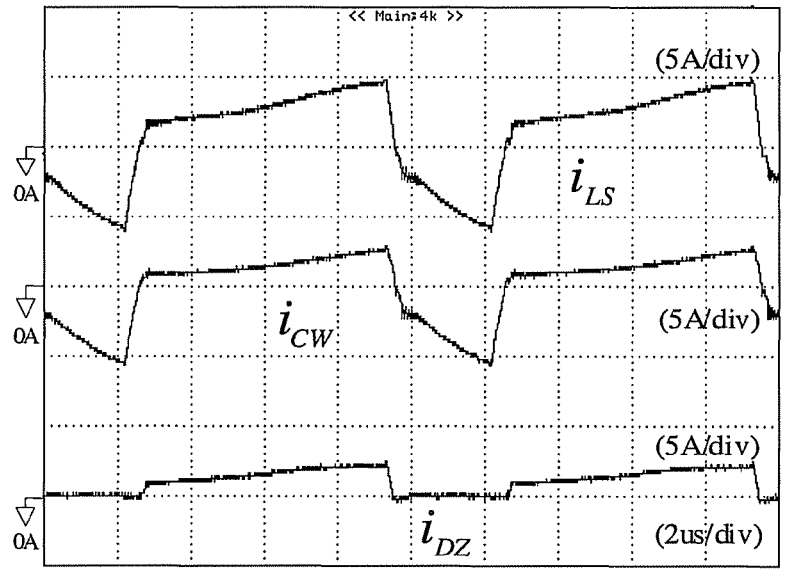
FIG. 18 is a plot illustrating experimental measurement results of the currents ($i_{LS}$, $i_{CW}$, $i_{DZ}$) flowing respectively through the second winding, a second capacitor and the output diode.

As shown in FIG. 18, during the ON-state of the first switch ($S_1$), the output capacitor ($C_O$) is charged by the current ($i_{DZ}$) flowing through the output diode thereby effectively reducing loop current components of the whole boost device, and further decreasing conduction loss of the first switch ($S_1$).

Figure 19:
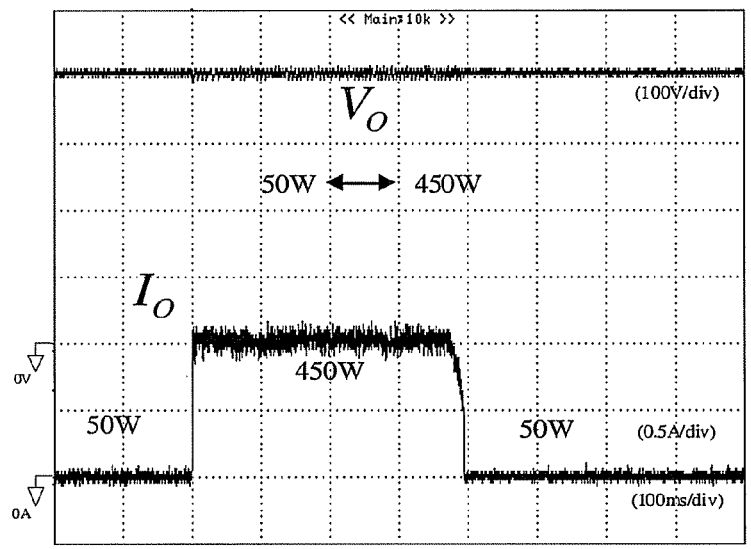
FIG. 19 is a plot illustrating experimental measurement results of an output voltage ($V_O$) boosted by the preferred embodiment, and a current ($I_O$) flowing through a variable load.

Referring to FIG. 19, the boost device is adapted to be coupled to a variable load so that the output power of the boost device is variable between 50 W and 450 W. In this case, when the input voltage ($V_{IN}$) slightly fluctuates, the output voltage ($V_O$) remains stable even though great variation of the output power occurs.

Figure 20:
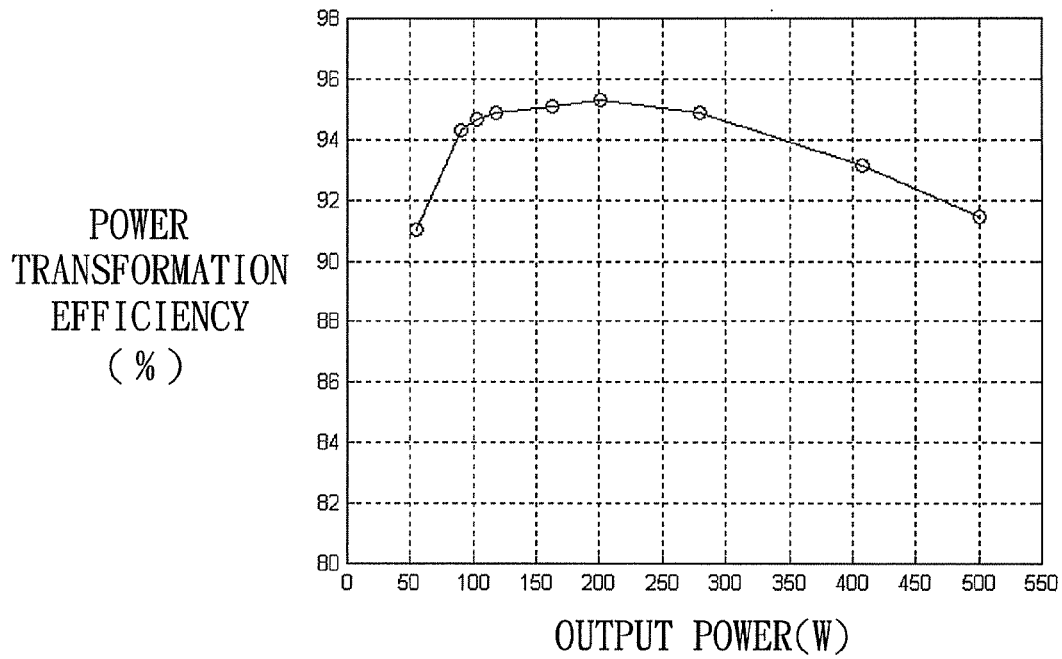
FIG. 20 is a plot illustrating experimental results of power transformation efficiency of the preferred embodiment for an input voltage of 17 Volts.

FIG. 20 illustrates experimental results of power transformation efficiency of the boost device of the preferred embodiment operated under a condition, where the input voltage ($V_{IN}$) and the output voltage ($V_O$) are respectively 17V and 400V. As shown in FIG. 20, the boost device has a maximum power transformation efficiency of about 95%, and when the output power is 500 W, the power transformation efficiency is over 91%.

The following are some of the advantages attributed to the boost device of the present invention:

1) Each of the first and second switches ($S_1$, $S_2$) has the clamp voltage equal to $V_O/[N(2-d)]$. If the duty cycle is equal to 1, the clamp voltage of each of the first and second switches ($S_1$, $S_2$) is relative to the output voltage ($V_O$) and the winding ratio of the first and second windings ($L_P$, $L_S$). Therefore, the boost device is suitable for an application with a large variation of the input voltage ($V_{IN}$).

2) The first and second switches ($S_1$, $S_2$), the first and second diodes ($D_W$, $D_Y$), and the output diode ($D_Z$) have soft switching characteristics. For the first and second diodes ($D_W$, $D_Y$), and the output diode ($D_Z$), a large reverse recovery current is avoided.

3) The waveform of the induced current ($i_{LS}$) has slopes opposite to those of the waveform of the exciting current ($i_{LM}$). As a result, the transformer 2 is capable of having a smaller exciting inductance. The volume of the iron core and the number of windings can be reduced. Therefore, the transformer 2 can be easily fabricated at a relatively low cost, and copper loss and iron core loss on a low-voltage side of the transformer 2 due to a large current can be reduced.

4) Due to the presence of the transformer 2, the boost device of the present invention has electrical isolation capability.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A boost device for boosting an input voltage supplied by an external power source to an output voltage, comprising:
   a transformer having first and second windings each having opposite first and second ends, said first end of said first winding being adapted to be coupled to the external power source;
   a first switch coupled between a reference node and said second end of said first winding of said transformer, and operable between an ON-state and an OFF-state;
   a clamp circuit adapted to be coupled to the external power source, coupled across said first winding of said transformer, and including a series connection of a clamp capacitor and a second switch, said second switch being operable between an ON-state and an OFF-state;
   an output diode having an anode coupled to said first end of said second winding of said transformer, and a cathode;
   an output capacitor having a first terminal coupled to said cathode of said output diode, and a second terminal, the output voltage being a voltage across said output capacitor, said output capacitor being capable of being charged through said output diode with an induced voltage across said second winding of said transformer; and
   a boost circuit coupled to said anode of said output diode and said second terminal of said output capacitor, and across said second winding of said transformer, said boost circuit being capable of being charged with the induced voltage across said second winding of said transformer, and of charging said output capacitor through said output diode so as to boost the voltage across said output capacitor;

wherein said boost circuit includes a first capacitor coupled between said second end of said second winding of said transformer and said second terminal of said output capacitor, said output capacitor being further charged through said output diode with a voltage across said first capacitor when said output capacitor is charged with the induced voltage across said second winding of said transformer.

2. The boost device as claimed in claim 1, wherein said boost circuit further includes a series connection of a first diode and a second capacitor coupled in parallel to said second winding of said transformer, said first diode having an anode coupled to said second capacitor, and a cathode coupled to said second end of said second winding of said transformer, said second capacitor being capable of being charged through said first diode with the induced voltage across said second winding of said transformer.

3. The boost device as claimed in claim 2, wherein said boost circuit further includes a second diode having an anode coupled to said second terminal of said output capacitor, and a cathode coupled to a common node between said anode of said first diode and said second capacitor, said first capacitor being capable of being charged through said second diode with a voltage across said second capacitor.

4. The boost device as claimed in claim 2, wherein, when said output capacitor is charged through said output diode with the induced voltage across said second winding of said transformer, said second capacitor of said boost circuit is charged through said first diode with the induced voltage across said second winding of said transformer.

5. The boost device as claimed in claim 1, wherein duration of the ON-state of one of said first and second switches does not overlap duration of the ON-state of the other one of said first and second switches.

6. The boost device as claimed in claim 1, wherein said clamp circuit further includes an inductor coupled in parallel to said first winding of said transformer.

7. The boost device as claimed in claim 1, wherein said first and second ends of said first winding of said transformer are polarity and non-polarity ends, respectively, said first and second ends of said second winding of said transformer being polarity and non-polarity ends, respectively.

* * * * *